G. A. SHIELDS.
REVERSIBLE POT.
APPLICATION FILED OCT. 26, 1914.

1,226,022.

Patented May 15, 1917.
2 SHEETS—SHEET 1.

Inventor
GEORGE A. SHIELDS

G. A. SHIELDS.
REVERSIBLE POT.
APPLICATION FILED OCT. 26, 1914.

1,226,022.

Patented May 15, 1917.
2 SHEETS—SHEET 2.

Inventor
GEORGE A. SHIELDS

UNITED STATES PATENT OFFICE.

GEORGE A. SHIELDS, OF COLUMBUS, OHIO.

REVERSIBLE POT.

1,226,022.  Specification of Letters Patent.  Patented May 15, 1917.

Application filed October 26, 1914. Serial No. 868,675.

*To all whom it may concern:*

Be it known that I, GEORGE A. SHIELDS, a citizen of the United States of America, residing at Columbus, in the county of Franklin and State of Ohio, have invented certain new and useful Improvements in Reversible Pots, of which the following is a specification.

The present invention relates to improvements in reversible pots especially designed for use in connection with glass making machines.

In the making of plate glass, which is drawn in cylindrical form, the cylinder is taken from a supply of glass that has been previously deposited in a receptacle or pot for holding the molten metal. The molten glass is deposited in the pot from a suitable furnace or tank, and after the withdrawal from the pot of each supply it is necessary that the pot be cleaned of the remaining molten glass before a fresh supply is poured into the pot. The reversible pot provides a device by means of which the cleaning operation and the drawing operation may take place at the same time, and thus time and labor are saved.

In the present invention certain novel features or improvements are supplied by means of which the reversible pot may be handled with greater facility and despatch and the glass drawing machinery may also be operated with greater economy and efficiency.

In the accompanying drawings I have illustrated one complete example of the physical embodiment of my invention constructed according to the best mode I have so far devised for the practical application of the principles of the invention.

Figure 1:
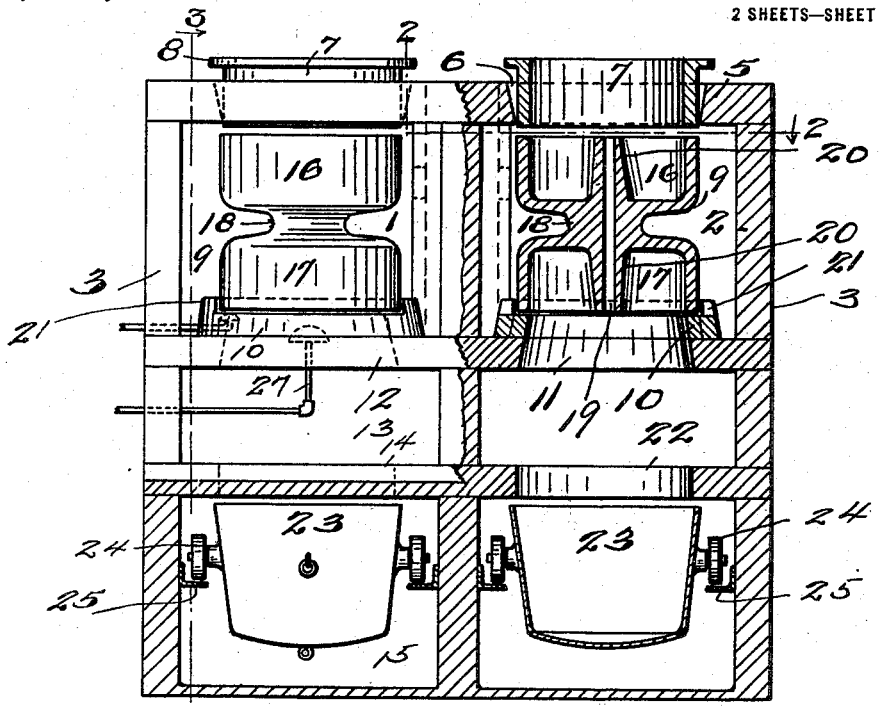
Figure 1 is a front elevation of the oven, partly broken away on line 1—1 of Fig. 3, and the doors omitted, showing the location and operative position of a pair of reversible pots constructed according to my invention.

In the preferred embodiment of my invention as exemplified in the drawings I have illustrated a pair of ovens as 1 and 2, the walls 3 of which are made of suitably refractory material and the open front is closed by a vertically sliding door 4. The top 5 of the ovens is perforated at 6 to receive a pouring ring or funnel 7, and this ring which is formed with an annular flange 8 may be supported by devices under this flange.

Within each oven a reversible pot as 9 is adapted to be supported upon an annular flange 10 fashioned about the opening 11 in the partition or floor 12 of the oven. Below this floor a chamber 13 is provided which has a floor 14 and below the floor 14 a compartment 15 is formed, for a purpose to be described.

The reversible pot 9 is fashioned with oppositely opening cylindrical receptacles 16 and 17, the walls of which are connected by a reduced portion or throat 18. An important feature of the reversible pot resides in the air duct 19 which extends throughout the entire length of the reversible pot. This duct is centrally located in the pot, passing through the throat 18, and through a pair of bosses 20, 20 each of which projects from the base or bottom of the receptacle 16 or 17. By means of this air duct, which is open at all times and never obstructed, a continuous current of hot air is provided from the chamber 13 and this draft of air passes into the cylinder of glass as it is being drawn from the molten mass in the receptacle 16 for instance in Fig. 1. By the presence of this air duct, numerous air inlet valves, piping and other mechanism are dispensed with, that would be otherwise necessary to furnish air to the cylinder of glass that is being drawn from the receptacle, to prevent collapse of the glass cylinder. The hollow hemispherical drawing head (not shown) is dipped into the molten glass in the pot and then lifted, drawing the molten glass upwardly. The plasticity of the molten glass lends itself freely to this mechanical drawing and a perfect cylinder is obtained of uniform thickness. As the cylinder is formed and drawn upwardly the heated air rushes through the air duct 19 to fill the vacuum in the cylinder and the pressure of air inside and outside the cylinder is thus equalized at atmospheric pressure.

In Fig. 1 it will be seen that the pot is supported on the flange 10, a guide shoulder 21 preventing displacement, and the air has an unobstructed passage up through the duct from the chamber 13.

In the front portion of each oven an opening 22 is provided in the floor or partition 14, and below this opening, in the chamber 15, a bucket 23 is located ready to receive the surplus glass as it is melted from the inverted receptacle of the pot. This bucket is provided with a pair of rollers 24 which run on the tracks 25 and the buckets with their load of surplus cold glass, convey the glass to the desired destination for proper disposition.

Figure 2:
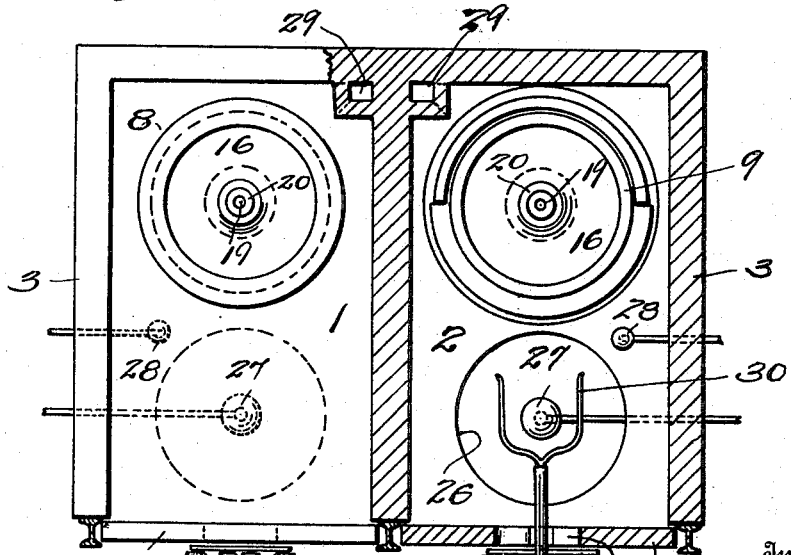
Fig. 2 is a top plan view, partly in section on line 2—2 of Fig. 1, showing one of the pots with a funnel or pouring ring above the same, and said ring omitted from the showing of the other pot, for convenience of illustration.
Figure 3:
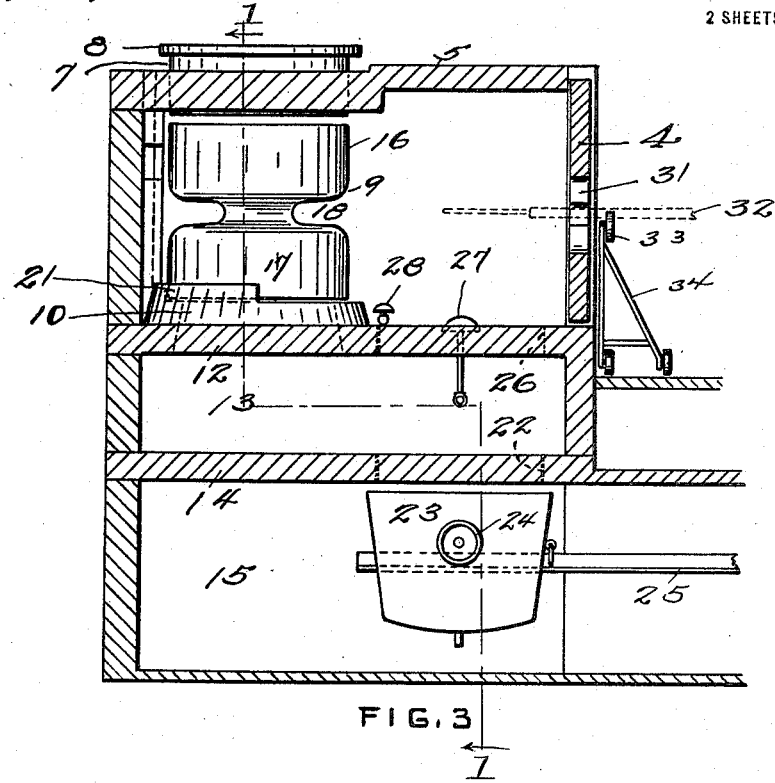
Fig. 3 is a vertical sectional view of the oven on line 3—3 Fig. 1 showing a pot therein in position to receive a supply of glass.

In the front of each oven, just above the opening 22 in the partition 14 and centrally located in an opening 26 is a gas burner 27 designed to melt the cold glass from the inverted receptacle so that it will fall into one of the buckets 23. A second burner 28 is provided in the ovens for the purpose of keeping the pot and contents hot at any desired temperature while the glass is being drawn therefrom. The burner 28, it will be noted in Fig. 2 is diametrically opposite the flue 29, with relation to the reversible pot, and this location of parts causes the flame and heated gases from the burner to pass around the pot on their way to the flue, thus spreading the heated gases over a maximum surface to heat the pot and contained glass.

The molten glass is supplied to the upper one of the receptacles of the reversible pot from a suitable source, and the glass is drawn therefrom in a cylindrical form by a glass drawing machine. After the supply has been drawn from the receptacle, it being understood that a residue remains in the receptacle, the pot is reversed. This reversal is accomplished by means of a forked or bifurcated tool 30 which is passed through a cruciform opening 31 in the sliding doors 4 and the bar or handle 32 of this tool is supported on a pair of rollers 33, 33 journaled at the top of a frame 34, so that the bar may be revolved or turned over on the rollers and the pot thus reversed. Before the pot is reversed however, it is first moved from the rear to the front of the oven, and in its forward position it is directly over the opening 26 and burner 27, so that with the pot in reversed position in the front of the oven, the burner will melt the cooled glass remaining in the inverted receptacle, and the glass will fall into the bucket 23, by which it is carried off.

The tool 30 it will be understood is passed around the throat of the glass pot and the pot moved from the rear to the front of the oven and then the pot reversed as described and by means of the burner the refuse in the inverted receptacle is burned and cleaned out by the gas burner.

Figure 4:
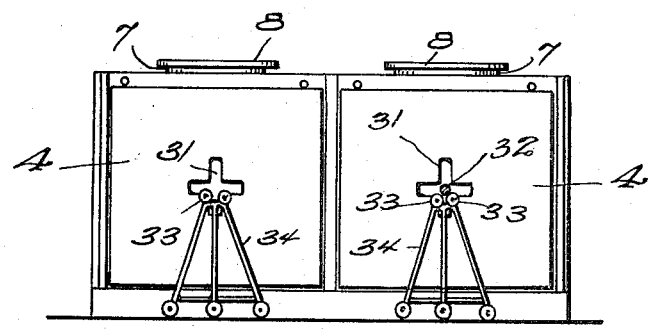
Fig. 4 is a front elevation showing a pair of furnaces and the supports for the turning tongs or reversing devices for the pots.

The sliding doors of the oven are lifted out of the way to gain access to the ovens, but when in operation the doors to the oven are closed as in Fig. 4.

In the drawings I have illustrated a pair of ovens and pots, but it will be apparent that a group of ovens may be employed, or a single one used, if desired.

What I claim is:—

1. An integral reversible glass pot comprising oppositely disposed receptacles and formed with an annular groove in the body of the pot between said receptacles of less diameter than the receptacles, adapted to accommodate an operating tool.

2. An integral reversible pot comprising alined oppositely, opening receptacles, and a single air duct extending through the body of the pot from end to end as described.

3. A glass pot comprising a pair of oppositely opening receptacles, a perforated boss projecting through each receptacle and an air duct extending through the body of the pot and communicating with said perforated bosses.

4. An integral pot comprising a pair of receptacles and formed with a central reduced throat between the receptacles adapted to accommodate an operating tool, a boss projecting through each receptacle, and an air duct extending through said bosses and throat.

In testimony whereof I affix my signature in presence of two witnesses.

GEORGE A. SHIELDS.

Witnesses:
 JOHN H. WITTEER,
 C. F. LUCKHART.

Copies of this patent may be obtained for five cents each, by addressing the "Commissioner of Patents Washington, D. C."